(12) United States Patent
Choby et al.

(10) Patent No.: US 7,568,316 B2
(45) Date of Patent: Aug. 4, 2009

(54) SACRIFICIAL SHIELD FOR A WINDOW ASSEMBLY

(75) Inventors: David A. Choby, Rochester Hills, MI (US); Michael D. Kobrehel, Elkhart, IN (US); Daryl F. Dankert, Mishawaka, IN (US); Leroy C. Schmuck, Kendallville, IN (US); Todd E. Cripe, Goshen, IN (US); Harley Rensch, Corunna, IN (US); Kip B. Ellis, Goshen, IN (US)

(73) Assignee: Dura Global Technologies, Inc., Rochester Hills, MI (US)

(*) Notice: Subject to any disclaimer, the term of this patent is extended or adjusted under 35 U.S.C. 154(b) by 356 days.

(21) Appl. No.: 11/177,249

(22) Filed: Jul. 8, 2005

(65) Prior Publication Data
US 2006/0000162 A1 Jan. 5, 2006

Related U.S. Application Data

(63) Continuation-in-part of application No. 11/090,934, filed on Mar. 24, 2005, and a continuation-in-part of application No. 10/646,468, filed on Aug. 20, 2003.

(60) Provisional application No. 60/651,459, filed on Mar. 29, 2004, provisional application No. 60/404,666, filed on Aug. 20, 2002.

(51) Int. Cl.
*E06B 5/10* (2006.01)
*E06B 5/20* (2006.01)

(52) U.S. Cl. .................. 52/203; 52/202; 52/204.593; 52/204.597; 52/716.5; 49/61

(58) Field of Classification Search .............. 49/63, 49/50, 61, 463, 466, 202; 52/203, 204.1, 52/204.53, 204.593, 716.8, 718.04, 717.01, 52/202, 716.5, 786.12, 786.1, DIG. 12, 204.597, 52/204.71; 296/96.14, 95.1
See application file for complete search history.

(56) References Cited

U.S. PATENT DOCUMENTS

| | | | | |
|---|---|---|---|---|
| 2,193,852 A | * | 3/1940 | Axe | ............... 52/204.595 |
| 2,258,973 A | | 10/1941 | Cross et al. | |
| 2,591,048 A | | 4/1952 | Bush | |
| 2,781,111 A | * | 2/1957 | Kunkel | ............... 49/434 |
| 2,877,840 A | * | 3/1959 | Hurowitz et al. | ............... 160/91 |

(Continued)

FOREIGN PATENT DOCUMENTS

DE 3518724 A1 * 11/1986

(Continued)

*Primary Examiner*—Phi Dieu Tran A
(74) *Attorney, Agent, or Firm*—Porter, Wright, Morris & Arthur, LLP; Richard M. Mescher; Dean B. Watson

(57) ABSTRACT

Installation structure for installing and removing a sacrificial glazing panel. There is disclosed a removable retaining member for the sacrificial glazing panel that laterally pressures a primary glazing panel to seal and hold the primary glazing panel and holds the sacrificial glazing panel without lateral pressure. A unitary, dual-durometer retaining member is disclosed which is optimized for holding the primary glazing and the sacrificial glazing panel in different manners by having materials of two different hardnesses. Additionally, a retaining member is disclosed that has flocking material to reduce rattling of the sacrificial glazing panel.

6 Claims, 12 Drawing Sheets

U.S. PATENT DOCUMENTS

| | | | |
|---|---|---|---|
| 3,055,468 A * | 9/1962 | Horejs et al. | 52/393 |
| 3,208,111 A * | 9/1965 | Grossman | 49/425 |
| 3,442,059 A * | 5/1969 | Kessler | 52/204.595 |
| 4,042,004 A * | 8/1977 | Kwan | 160/91 |
| 4,055,031 A * | 10/1977 | Okawa et al. | 52/172 |
| 4,160,348 A * | 7/1979 | Chapman et al. | 52/202 |
| 5,131,194 A | 7/1992 | Anderson | |
| 5,735,089 A * | 4/1998 | Smith et al. | 52/202 |
| 5,809,707 A | 9/1998 | Bargados et al. | |
| 5,887,959 A * | 3/1999 | Yuri | 312/7.2 |
| 6,012,257 A * | 1/2000 | Caplette | 52/202 |
| 6,047,500 A | 4/2000 | Caplette | |
| 6,205,723 B1 | 3/2001 | Farrar et al. | |
| 6,206,453 B1 | 3/2001 | Farrar et al. | |
| 6,408,574 B1 | 6/2002 | Farrar et al. | |
| 6,425,215 B2 | 7/2002 | Farrar | |
| 6,688,044 B2 | 2/2004 | Farrar et al. | |
| 6,832,457 B2 * | 12/2004 | Geiger | 52/656.5 |
| 6,871,902 B2 | 3/2005 | Carson et al. | |
| 7,021,006 B2 | 4/2006 | Farrar et al. | |
| 7,082,736 B2 | 8/2006 | Farrar et al. | |

FOREIGN PATENT DOCUMENTS

| | | | |
|---|---|---|---|
| EP | 180498 A2 * | 5/1986 | |

* cited by examiner

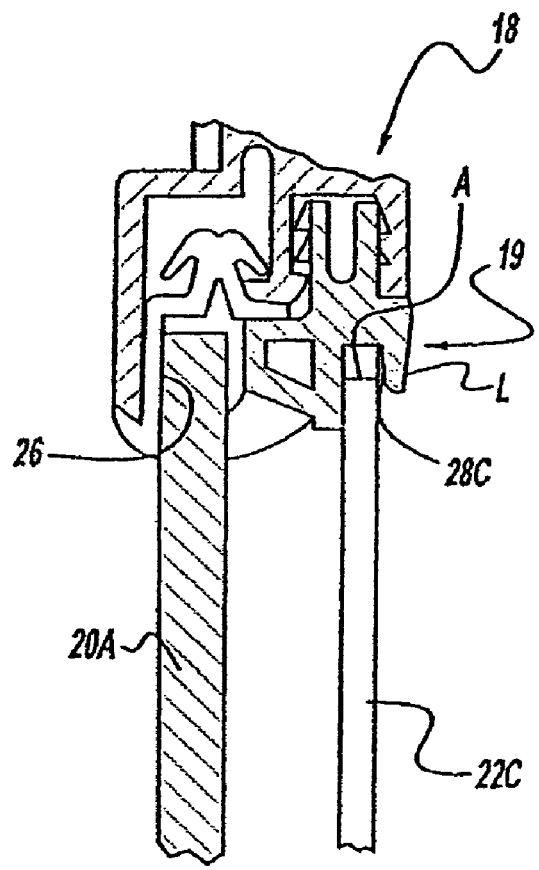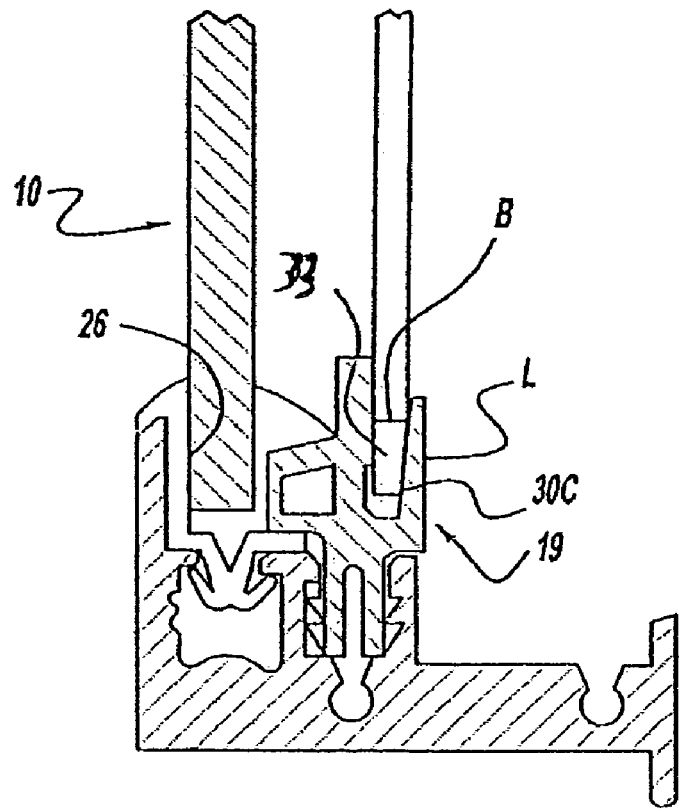
FIG-12B

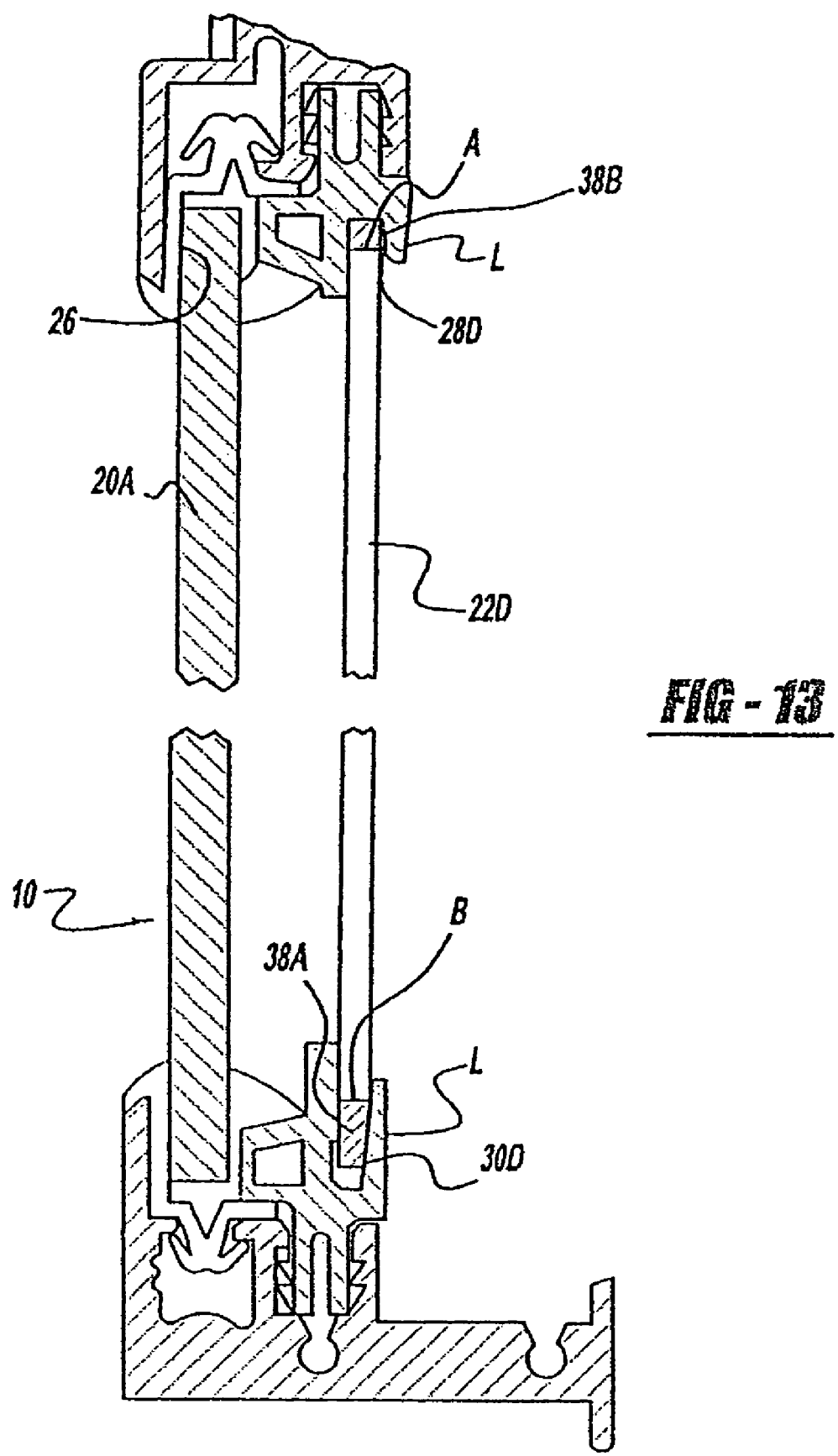

SACRIFICIAL SHIELD FOR A WINDOW ASSEMBLY

CROSS-REFERENCE TO RELATED APPLICATIONS

The present application is a continuation-in-part application of U.S. patent application Ser. No. 11/090,934 filed on Mar. 24, 2005, which is entitled to the priority benefit of U.S. Provisional Patent Application No. 60/651,459 filed on Mar. 29, 2004 and is a continuation-in-part application of U.S. patent application Ser. No. 10/646,468 filed on Aug. 20, 2003 which is entitled to the priority benefit of U.S. Provisional Patent Application No. 60/404,666 filed on Aug. 20, 2002, the disclosures of which are each expressly incorporated herein in their entireties.

STATEMENT REGARDING FEDERALLY SPONSORED RESEARCH

Not Applicable

REFERENCE TO MICROFICHE APPENDIX

Not Applicable

FIELD OF THE INVENTION

The present invention generally relates to window assemblies having apparatus for protecting primary glazing panels and, more particularly, to such assemblies for use in vehicles.

BACKGROUND OF THE INVENTION

Primary glazing panel installations are usually formed of heavy tempered plate glass. The panels are usually sealed around the edges to prevent the entrance of water, dirt, wind, etc. The primary glazing panel installations, especially the ones used in public transportation buses, tend to be expensive and difficult to replace. To protect the primary glazing from vandalism or other damage, replaceable protective glazing panels have been used on the inside of motor vehicles. Examples of sacrificial glazing installations include those described in U.S. Pat. Nos. 5,735,089; 5,809,707; 6,205,723; 6,408,574; 6,688,044, the disclosures of which are incorporated herein by reference.

However, there is a need in the market for low cost sacrificial glazing installations and methods which are simple and fast to perform, that protect the primary glazing, or that tend to be tamper resistant.

SUMMARY OF THE INVENTION

Disclosed herein are window assemblies, sacrificial glazing installations, and methods of installing and removing sacrificial glazing panels that can provide low cost sacrificial glazing installations and methods which are simple and fast to perform, that protect the primary glazing, reduce rattling or that tend to be more tamper resistant, which embodiments will be evident from the ensuing disclosure.

In one embodiment, the window assembly comprises a frame for mounting to a vehicle, a primary glazing panel held within a first perimeter channel formed by the frame, and a sacrificial glazing panel disposed inward of the primary glazing panel and held within a second perimeter channel formed by the frame. The frame pressures the primary glazing panel in a lateral direction to form an interference fit in the lateral direction. The frame does not pressure the sacrificial glazing panel in a lateral direction so that the sacrificial glazing is free an interference fit within the second channel in the lateral direction.

In another embodiment, the window assembly comprises a frame for mounting to a vehicle, a primary glazing panel held within a first perimeter channel formed by the frame, and a sacrificial glazing panel disposed inward of from the primary glazing panel and held within a second perimeter channel formed by the frame. The frame includes a unitary, dual-durometer retaining member forming the second channel.

In another embodiment, the window assembly comprises a frame for mounting to a vehicle, a primary glazing panel held within a first perimeter channel formed by the frame, and a sacrificial glazing panel disposed inward of the primary glazing panel and held within a second perimeter channel formed by the frame. Flocking material is located within the second channel between the frame and the sacrificial glazing panel.

BRIEF DESCRIPTION OF THE DRAWINGS

These and further features of the present invention will be apparent with reference to the following description and drawings, wherein:

FIG. 12B is a fragmentary section view of a fifth alternate embodiment of a sacrificial glazing panel installed in a receiving channel section.

FIG. 13 is a fragmentary section view of a sixth alternate embodiment of a sacrificial glazing panel installation.

Figure 1:
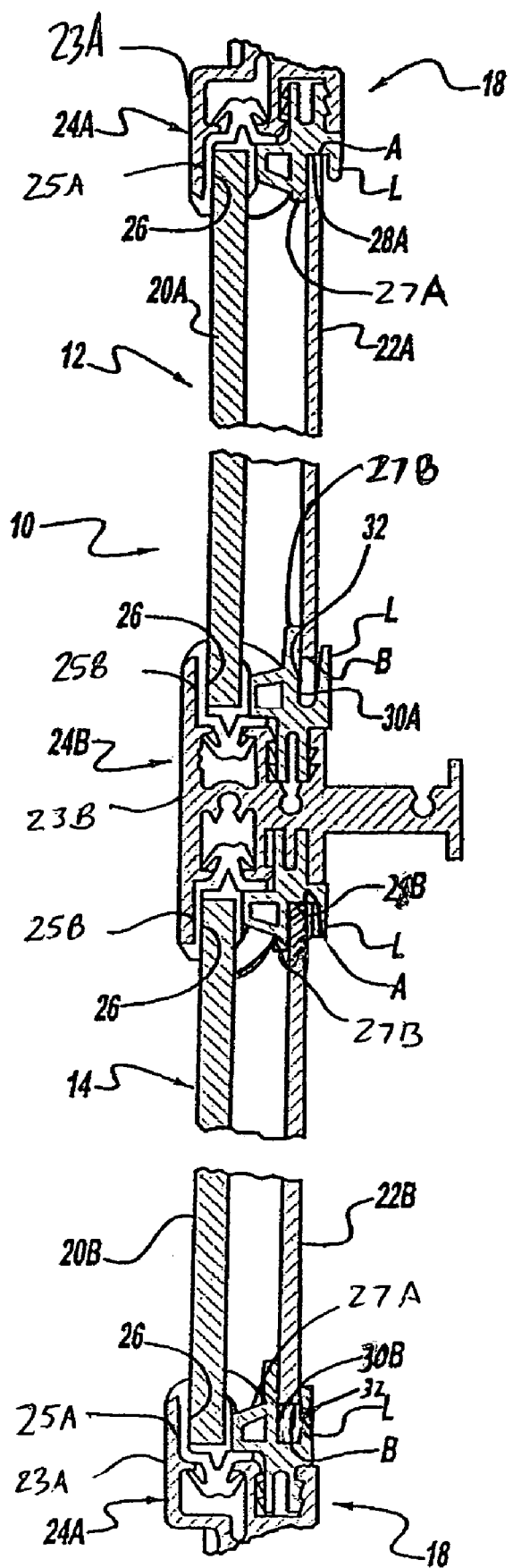
FIG. 1 is a vertical sectional view of a window having upper and lower glazing assemblies each including a sacrificial glazing panel installation according to the invention.

It should be understood that the appended drawings are not necessarily to scale, presenting a somewhat simplified representation of various preferred features illustrative of the basic principles of the invention. The specific design features of sacrificial glazing panels as disclosed herein, including, for example, specific dimensions, orientations, locations, and shapes of the various components, will be determined in part by the particular intended application and use environment. Certain features of the illustrated embodiments have been enlarged or distorted relative to others to facilitate visualization and clear understanding. In particular, thin features may be thickened, for example, for clarity or illustration. All references to direction and position, unless otherwise indicated, refer to the orientation of the window assembly illustrated in the drawings. In general, up or upward generally refers to an upward direction in FIG. 1 and down or downward generally refers to a downward direction in FIG. 1. Also in general, fore or forward refers to a direction toward the front of the vehicle and aft or rearward refers to a direction toward the rear of the vehicle. Also in general, lateral or transverse refers to a direction normal to the plane of the window panels.

DETAILED DESCRIPTION OF CERTAIN PREFERRED EMBODIMENTS

In the following description, certain specific terminology will be employed for the sake of clarity and a particular embodiment described in accordance with the requirements of 35 U.S.C. 112, but it is to be understood that the same is not intended to be limiting and should not be so construed in as much as the invention is capable of taking many forms and variations within the scope of the appended claims.

Figure 2:
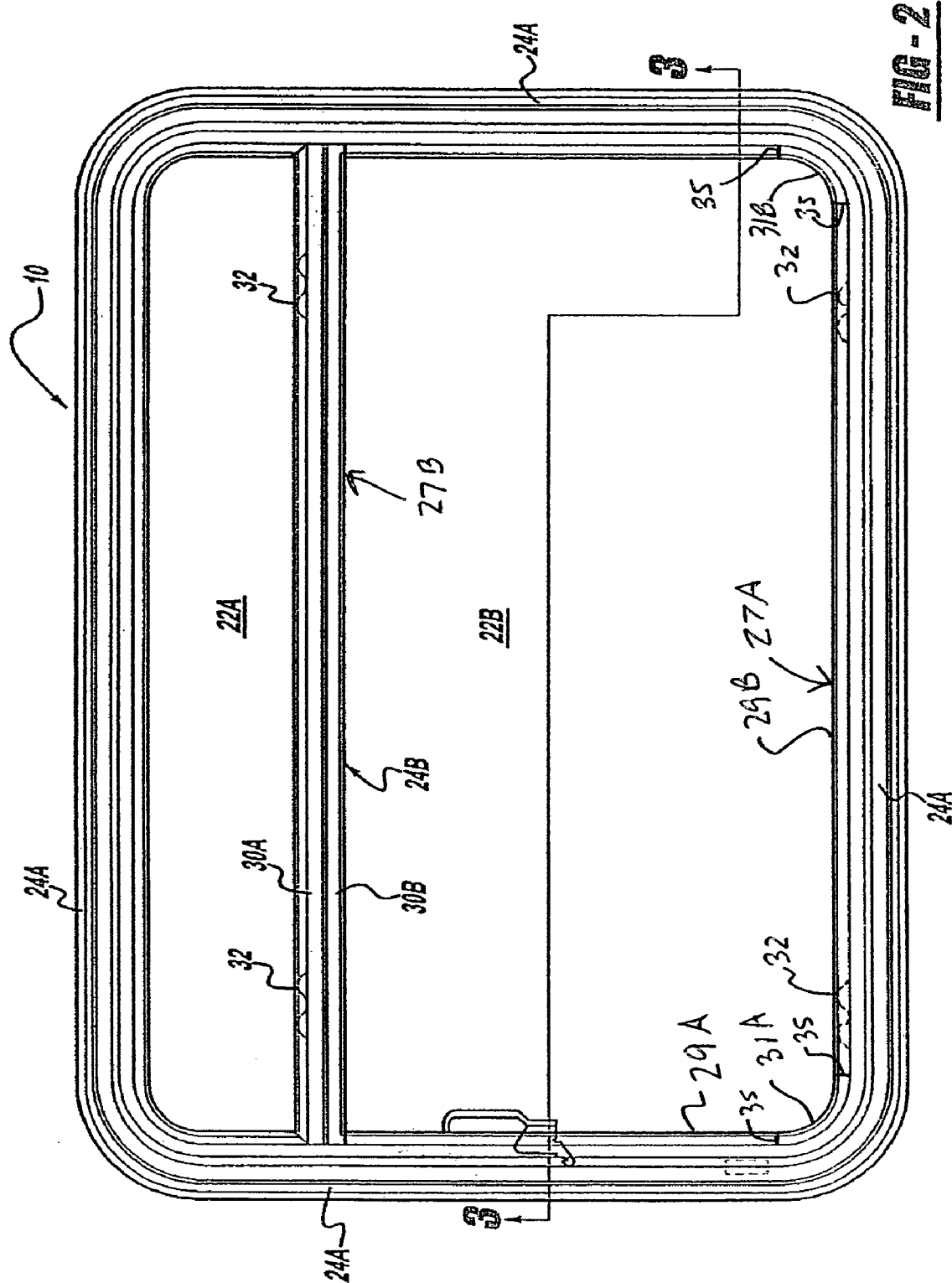
FIG. 2 is a front view of the window shown in FIG. 1.
Figure 3:
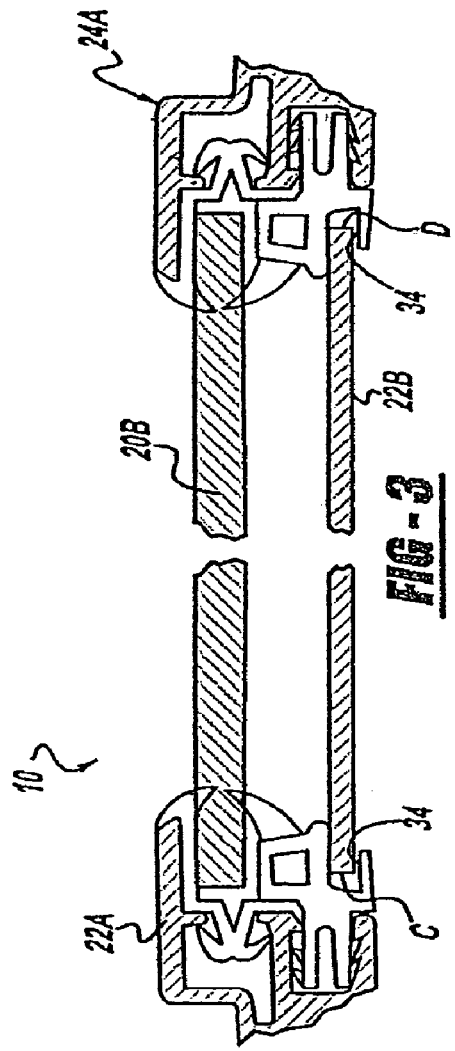
FIG. 3 is a fragmentary sectional view of a horizontal section taken through the window shown in FIG. 2

Referring to the drawings, and particularly to FIGS. 1-3, depicted therein is a vehicle window assembly 10 which includes an upper glazing assembly 12 and a lower glazing assembly 14 for mounting in a vehicle body. The primary glazing may be bonded to the frame or compressed to fit therein with a frame and seal assembly 18. If bonded, the primary glazing may be bonded by any suitable method, such as adhesives, molded together, etc. A bonded primary glazing offers advantages in certain applications. The primary glazing may be flush mounted. The frame may be made of any suitable material, such as metal or a polymer. The frame may be aluminum. An aluminum frame could incorporate corners bent to a desired radius or could incorporate mitered corners. Primary glazing panels may be constructed of any suitable material, such as tempered glass, laminated glass, acrylic, polycarbonate, etc.

As shown, the window assembly 10 includes two window sections each having a primary glazing panel 20A, 20B, and associated seals carried in respective retainer frames. Although the description is to a multi-window assembly, the window assembly may also be modified to be a single window assembly.

The window assembly 10 as shown includes a perimeter frame section 24A and mullion frame section 24B disposed inward of. The illustrated perimeter frame section 24A is generally rectangular-shaped with rounded corners but can alternatively have any other suitable shape. The illustrated mullion frame section 24B is substantially straight but can alternatively have any other suitable shape. The window assembly 10 could be flat in both the vertical and the horizontal directions or could incorporate simple radius curvature in either or both directions.

The illustrated retainer frame sections 24A, 24B include perimeter and mullion frames 23A, 23B and gasket or seal members 25A, 25B secured to the perimeter and mullion frames 23A, 23B. The perimeter and mullion frames 23A, 23B are preferably formed of aluminum but can alternatively be formed of any other suitable material such as for example a plastic material, steel, or the like. The seal members 25A, 25B form the channels 26 for the primary glazing panels 20A, 20B. The seal members 25A, 25B are preferably formed of a relatively soft material so that the seal members 25A, 25B are suitable for use with any shape frame to hold and seal the primary glazing panels 20A, 20B with resilient force, forming an interference fit with the primary glazing panels 20A, 20B. The seal members 25A, 25B are preferably formed of a flexible rubber, such as EPDM or polyvinyl chloride (PVC). The seal members 25A, 25B, however, can alternatively be formed of other suitable materials. The illustrated seal members 25B, 25A are secured to the frames 23A, 23B by "arrows" or interlock protrusions but can additionally or alternatively be connected in any suitable manner such as, for example, bonded, welded or employing serrations.

The retainer frame sections 24A, 24B may also be used to mount sacrificial glazing panels 22A, 22B. Each sacrificial glazing panel 22A, 22B has a top, bottom and side edges A, B, C, D, each edge may be received in an associated perimeter channel section defined by a respective retainer section 24A and 24B. The retainer frame sections 24A, 24B act as one type of support for the sacrificial glazing panels.

The illustrated retainer frame sections 24A, 24B also include retaining gaskets or retainer members 27A, 27B secured to the perimeter and mullion frames 23A, 23B. The illustrated retainer members 27A, 27B are secured to the frames 23A, 23B by integral "arrows" or other interlock protrusions but can additionally or alternatively be connected in any suitable manner such as, for example, bonded or welded. The illustrated retainer members 27A, 27B include an integral seal engaging portion that engages the seal members 25A, 25B to seal and hold the seal members 25A, 25B and the primary glazing panels 20A, 20B therein. The illustrated seal-engaging portions of the retainer members 27A, 27B are sized and shaped to apply lateral pressure onto seal members 25A, 25B to form an interference fit with the primary glazing panels 20A, 20B in the lateral direction, that is, a direction normal to the primary glazing panels 20A, 20B.

The retainer members 27A, 27B form the channels 28A, 28B, 30A, 30B for holding the sacrificial glazing panels 22A, 22B. The illustrated retainer members 27A, 27B are sized and shaped and shaped so that the channels 28A, 28B, 30A, 30B do not apply lateral pressure onto the sacrificial glazing panels 22A, 22B and no interference fit is formed in the lateral direction. The illustrated retainer members 27A, 27B are also sized and shaped so that the upper and lower channels 28A, 28B, 30A, 30B are spaced apart a distance larger than the height of the respective sacrificial glazing panels 22A, 22B to form a gap therebetween. This gap facilitates installation of the sacrificial glazing panels 22A, 22B into the retaining members 27A, 27B as described in more detail below.

The retainer members 27A, 27B are preferably formed of a semi-rigid material such as, for example, a rubber like polyvinyl chloride (PVC). The retainer members 27A, 27B may include a U-shaped channel with a first wall, a second wall and a floor supported by a base. The retainer members 27A, 27B or the channel walls of the retainer members 27A, 27B and/or the floor of the channel, and/or the base have a durometer in the range of about 85 to about 100 and more preferably have a durometer of about 90 to about 95. The retainer members 27A, 27B, however, can alternatively be formed of other suitable materials and/or can alternatively have other suitable durometers as discussed in more detail hereafter. The material of the retainer members 27A, 27B can also be made deformable to allow the retainer members 27A, 27B to be fabricated as flat members and still easily conform to the shape of a complex curved window assembly.

The illustrated retainer member 27A cooperating with the perimeter frame 23A, includes two straight sections or segments 29A, 29B connected by two radiused corner sections or segments 31A, 31B. The first straight section 29A forms the top and sides of the retainer member 27A as well as the top two corners and the second straight section 29B forms the bottom of the retainer member 27A. It is noted that the illustrated first straight section 29A is bent to form the top two corners. The radiused corner sections 31A, 31B are configured to transition between the relatively shallow side channels 34 and the relatively deep lower channel 30B. The illustrated radiused corner sections 31A, 31B are secured to the straight sections 29A, 29B by welds 35, but can alternatively be secured together in any other suitable manner. The straight sections 29A, 29B are preferably extruded while the radiused corner sections 31A, 31B are preferably molded. The various sections 29A, 29B, 31A, 31B of the retainer member 27A, however, can alternatively be formed in any other suitable manner. It is noted that any other combination of straight sections and radiused corner sections can alternatively be utilized.

Upper channels 28A, 28B and lower channels 30A, 30B are formed in part by outer lip portions L of the retainer members 27A, 27B which define an opening smaller in size than the size of the sacrificial glazing panels 22A, 22B.

The illustrated lower channels 30A, 30B each have at least one resiliently compressible positioner element or member installed in the bottom thereof. Positioning at least one resiliently compressible positioner element in the bottom of a channel 28A, 28B, 30A, 30B prevents a sacrificial glazing panel 22A, 22B from resting on any recessed surface of a channel 28A, 28B, 30A, 30B. As shown in FIG. 2, the illustrated positioner member is in the form of a pair of double bowed leaf springs 32. The leaf springs 32 act as a biasing member that allows the resilient repositioning of the lower edges B of sacrificial glazing panels 22A, 22B at intermediate positions in the channel sections 30A, 30B after downward pressure of the glazing panels 22A, 22B has been released. Repositioning allows the top edges A of the panels 22A, 22B to be raised to a location within the channel lip L without a gap to securely retain the glazing panels 22A, 22B in the upper channel sections 28A, 28B with a positive force or interference fit. The leaf springs 32 provide a resilient upward force to the sacrificial glazing panels 22A, 22B so that there is the gap during installation and there is the positive force or interference fit once installed. The compression characteristics of the spring 32 along with the stack up tolerances of the components can be used to determine how the sacrificial glazing panel 22A, 22B will seat in the channel 28A, 28B, 30A, 30B, for example, the spring 32 can be used to seat the sacrificial glazing panel 22A, 22B against the channel section opposite the positioner element with an interference fit or leave a gap. It is noted that the positioner element can alternatively be in the form of a single bow leaf spring, a wave spring or other spring element, a compressible foam element, a compressible elastomer element, a spring and slider assembly, a foamed elastomeric element, or the like. The resiliently compressible positioner element may be located in any one of the upper, lower, or side channels 28A, 28B, 30A, 30B, 34 or in any possible combination of those channels 28A, 28B, 30A, 30B, 34.

The sacrificial glazing panels 22A, 22B are preferably flexible. A flexible glazing panel 22A, 22B may be constructed of relatively thin material, (such as less than one half inch, and more preferably $1/8^{th}$ inch plus or minus $7/64^{th}$). Suitable materials include plastic, polycarbonate, acrylic, etc. The panels 22A, 22B are preferably of a size greater than the openings defined by the retaining lips L, but of a size smaller than distances defined by the support or channels 28A, 28B, 30A, 30B. The sacrificial glazing panels 22A, 22B are preferably of a size such that when the center of the panels 22A, 22B are bowed, as with the use of a pair of handled suction cups, the side edges C, D can be drawn in to allow one edge to be removed or inserted from or into the lower channel 30A or 30B. It is noted that the initial receiving channel can alternatively be the upper channels 28A, 28B or the side channels 34 rather than the lower channels 30A, 30B. When the initial receiving channel is the upper channels 28B, 28B, the bottom edge B of the sacrificial glazing panels 22A, 22B can be gravity biased down into the lower channel 30A, 30B, and then the panels 22A, 22B need only be lifted up until the bottom edge B clears the associated channel lip L and the panel 22A, 22B is then bowed to allow tilting out and removal. Thus, a positioner element may not be necessary to retain the top edge A.

The upper channels 28A, 28B may be shallower then the opposing lower channels 30A, 30B so that when the bottom edge B of the sacrificial glazing panel 22A or 22B is first inserted and moved sufficiently towards the bottom of the respective lower channel 30A, 30B, the opposite top edge A more easily clears the lip L of the respective upper channel 28A, 28B to allow the glazing panel 22A or 22B to be completely moved into the frame. Upon release, the side edges C, D of the sacrificial glazing panel 22A, 22B move apart to be received and retained in the associated side channels 34 (FIG. 3) of the perimeter frame sections 24A and 24B. The side channels 34 preferably also have shallower depths like the upper channels 28A, 28B To remove a sacrificial glazing panel 22A, 22B, the glazing panel 22A, 22B may be forcibly pressed downward to compress the double bowed leaf springs 32, moving the top edge A down sufficiently to clear the lip L of the associated upper channel 28A, 28B. The sacrificial glazing panel 22A, 28B may also be bowed to draw together side edges C, D to clear lip L of the side channels 34 and allow the sacrificial glazing panels 22A, 28B to be tilted and lifted out of the lower channel 30A, 30B. With the sacrificial glazing panels 22A, 22B removed, the retainer members 27A, 27B continue to hold and seal the primary glazing panels 20A, 20B. To remove a primary glazing panel 20A, 20B, the retainer members 27A, 27B must be removed.

Figure 4:
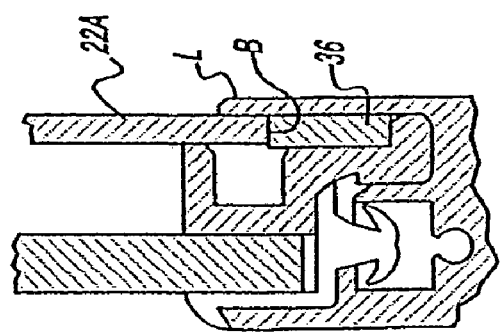
FIG. 4 is a fragmentary sectional view of an alternate embodiment of a sacrificial glazing panel installation.

FIG. 4 shows an alternative embodiment wherein the positioner element is in the form of one or more compressible foam pieces 36 positioned to engage the lower edge B of the upper sacrificial glazing panel 22A to resiliently urge and hold the same in the upper channel 28A formed by the lip L. It is noted that the compressible foam pieces 36 can also be utilized with the lower sacrificial glazing panel 22B.

Figure 5:
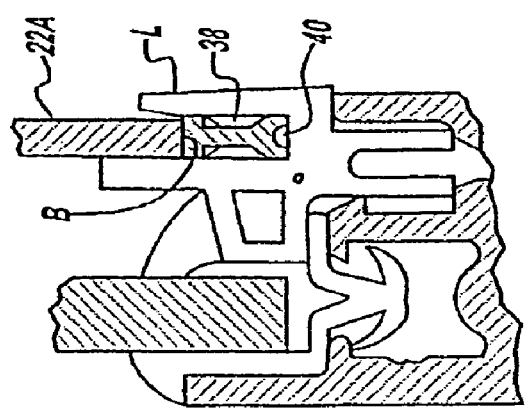
FIG. 5 is a fragmentary section view of a second alternate embodiment of a sacrificial glazing panel installation.

FIG. 5 shows an alternative embodiment wherein the positioner element is in the form of a compressible elastomeric element 38 to engage the lower edge B of the upper sacrificial glazing panel 22A to resiliently urge and hold the same in the upper channel 28A formed by the lip L. The elastomeric element 38 has a space 40 allowing downward movement when removing the sacrificial glazing panel 22A from lip L. It is noted that the compressible elastomeric element 38 can also be utilized with the lower sacrificial glazing panel 22B.

Figure 6:
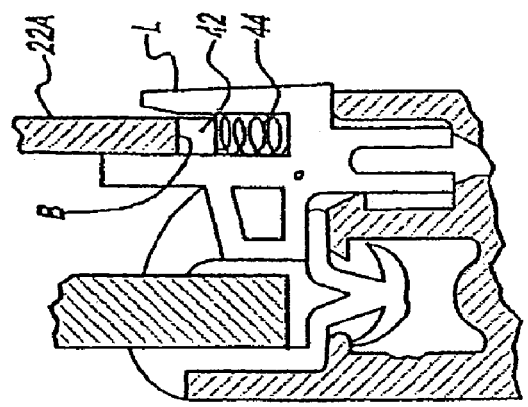
FIG. 6 is a fragmentary section view of a third alternate embodiment of a sacrificial glazing panel installation.

FIG. 6 shows an alternative embodiment wherein the positioner element is in the form of a slide 42 and a compression spring 44 engaging the underside of the slide 42 to resiliently urge and hold the same up to position the top edge A of the sacrificial glazing panel 22A within the upper channel 28A. It is noted that the slide and compression spring 42, 44 can also be utilized with the lower sacrificial glazing panel 22B.

Figure 7:
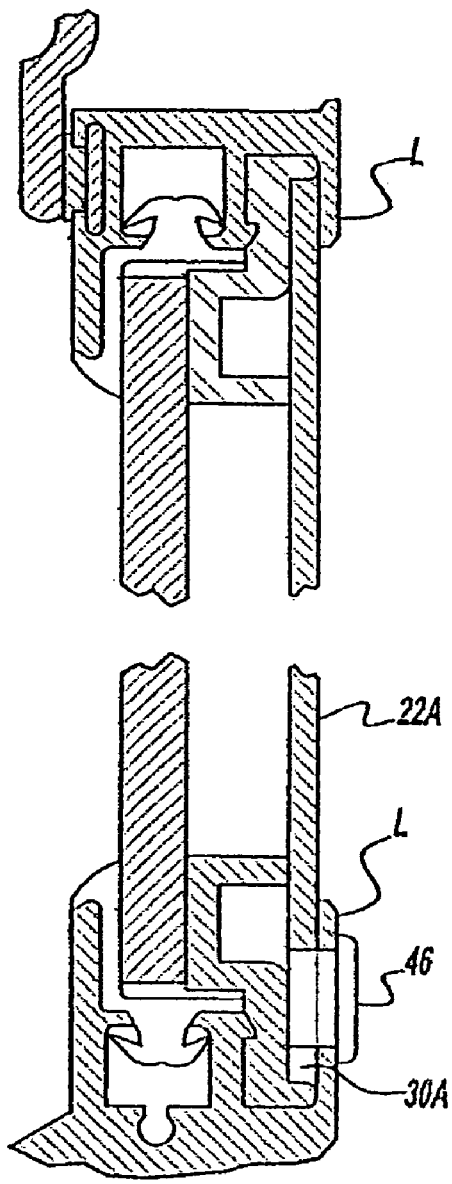
FIG. 7 is a fragmentary section view of a fourth alternate embodiment of a sacrificial glazing panel installation.
Figure 8:
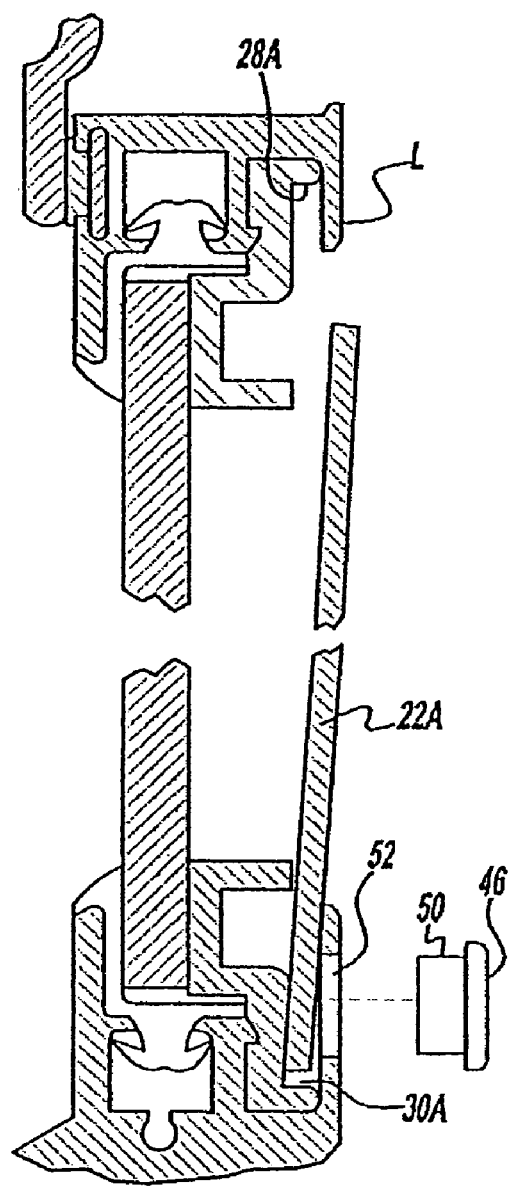
FIG. 8 is a view of the sacrificial glazing panel installation show in FIG. 7, but with the positioner plugs removed.

FIGS. 7 and 8 show an alternative embodiment wherein the positioner element is in the form of a plurality of removable headed plugs 46 insertable into the lip L at the lower channel 30A to engage the lower edge B of the upper sacrificial glazing panel 22A to resiliently urge and hold the same in the upper channel 28A formed by the lip L. The plugs 46 may each have a stem 50 for protruding through an opening 52 and into the lower channel 30A to hold the sacrificial glazing panel 22A in its up or seated position.

Upon removal of the plugs 46, the sacrificial glazing panel 22A is lowered sufficiently to clear the lip L of the upper channel 28A, so that upon bowing of the panel 22A, it may be tilted out of and removed as described above. It is noted that the plugs 46 can also be utilized with the lower sacrificial glazing panel 22B. All of the embodiments shown in FIGS. 4 to 8 have the positioner element shown in the lower channel 30A, 30B. These, and others, can be modified to have the positioner element in the upper channel 28A, 28B or the side channels 34.

Figure 15:
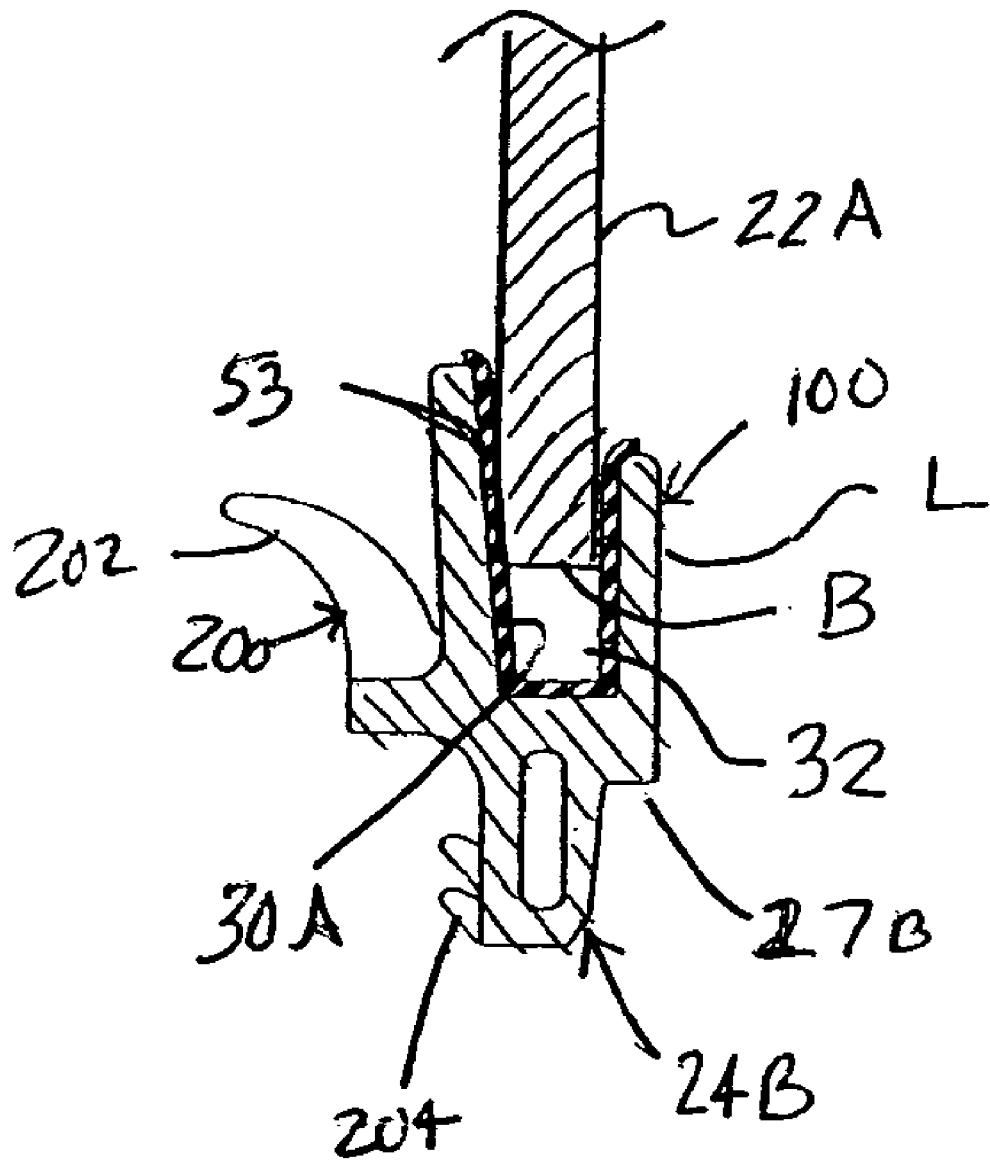
FIG. 15 is a fragmentary sectional view of an alternate embodiment of a sacrificial glazing panel installation.

FIG. 15 shows an alternative embodiment with a retaining member 27A, 27B that is detachable from the frame and wherein the channels 28A, 30A, 34 are provided with flocking material 53 so that the upper sacrificial glazing panel 22A is separated from and does not contact the frame sections 24A, 24B. The flocking material 53 acts as a cushion to aid in preventing rattling noise due to vibrational movement of the glazing panel 22a against the frame sections 24A, 24B and also acts to aid in forming a weather seal therebetween. The illustrated flocking material 53 covers the entire surface of each of the channels 28a, 30A, 34, less the channels in the molded corners 31A, 31B but can alternatively cover only a portion of the channels 28A, 30A, 34, less than all of the channels 28A, 30A, 34, or any combination thereof. It is noted that the flocking material 53 is also preferably utilized with the lower sacrificial glazing panel 22B. As shown, the retaining member 27A, 27B forms the retaining channels 28A, 28B, 30A, 30B, 34 independent of the frame.

The flocking material 53 is preferably polyester flocking material having polyester flock or fibers. It is noted, however, that any other suitable type of flocking material can alternatively be utilized. The flocking material 53 is also preferably directly adhered to in the channels 28A, 30A, 34 with a suitable adhesive. It is noted that alternatively, the flocking material 53 can be in the form of flock tape having flock adhered to a carrier film which is then adhered to the channels 28A, 30A, 34. The carrier film can be formed of any suitable material such as, for example, PVC film, polyolefin film, or the like.

The alternative embodiment shown in FIG. 15 also shows that the retainer members 27A, 27B can advantageously be unitary members of dual durometer materials, that is, one-piece members each comprised of two materials having different durometers. The illustrated retainer member 27B has a first portion 100 that forms the channel 30A and a second portion 200 that forms a seal-engaging portion or wing 202 and interlock portions or extensions 204 in the form of a pair of saw teeth. The first portion 100 is formed of a first material and the second portion 200 is formed of a second material wherein the second material is softer than the first material, that is, the second material has a lower durometer than the first material. The relatively harder, higher durometer material of the first portion 100 enables the channels 28A, 30A, 34 of the retainer members 27A, 27B to be relatively stiff and rigid for supporting the sacrificial glazing panels 22A, 22B. The relatively softer, lower durometer material of the second portion 200 enables the retainer members 27A, 27B to be more easily installed and removed from the perimeter and mullion frames 23A, 23B. Note that the wing 202 is sized and shaped to engage the seal members 25A, 25B to hold the seal member 25A, 25B and the primary glazing panels 20A, 20B in place. Also note that the interlock extensions are sized and shaped to cooperate with the perimeter and mullion frames 23A, 23B to secure the retainer members 27A, 27B to the perimeter and mullion frames 23A, 23B. It is noted that the straight sections 29A, 29B of the retainer members 27A, 27B are preferably formed of dual durometer materials in this manner but the radiused corner sections 31A, 31B of the retainer member 27A are preferably formed solely of the harder material.

The first and second materials are preferably each a flexible rubber such as, for example, polyvinyl chloride (PVC). The first material preferably has a durometer in the range of about 85 to about 100 and more preferably has a durometer in the range of about 90 to about 95. The second material preferably has a durometer in the range of about 60 to about 70 and more preferably has a durometer of about 65. The first and second materials, however, can alternatively be other suitable materials and/or can alternatively have other suitable durometers. The first material preferably has a greater durometer than the second material. The dual durometer, unitary retainer members 27A, 27B are preferably formed by co-extrusion. The dual durometer, unitary retaining members 27A, 27B, however, can alternatively be formed in any other suitable manner such as, for example co-molding, or separate extrusions or molded components secured together by welding, adhesive, or other suitable manner.

The seal engaging portion 202 of the alternative embodiment shown in FIG. 15, is in the form of a wing. The wing 202 is positioned so that it is located between the spaced-apart primary glazing panels 20A, 20B and the sacrificial glazing panels 22A, 22B. The illustrated wing 202 cantilevers from a position located near but outward of the bottom of the channels 28A, 30A and extends upward between the panels and outward toward the primary glazing panels 20A, 20B where its free end engages the seal members 25A, 25B. The illustrated wing 202 is arcuate or curved in cross-section. The illustrated wing 202 also has a reducing thickness in a direction from its fixed end to its free end, that is, the thickness at the fixed end is greater than the thickness at the free end. Note that the wing 202 is sized and shaped to engage the seal members 25A, 25B to hold the seal member 25A, 25B and the primary glazing panels 20A, 20B in place. Formed in this manner, the wing 202 engages and exerts pressure on the seal members 25A, 25B in the lateral direction, normal to the primary glazing panels 20A, 20B, so that the seal members 25A, 25B form an interference fit with the primary glazing panels 20A, 25 in the lateral direction and firmly secure the primary glazing panels 20A, 20B therein. In contrast, the retaining members 27A, 27B no pressure on the sacrificial glazing 22A, 22B in the lateral direction, normal to the sacrificial glazing panels 22A, 22B, so that there is not an interference fit in the lateral direction. The sacrificial glazing panels 22A, 22B are secured only with pressure applied to the edges of the sacrificial glazing panels 22A, 22B in the vertical and/or horizontal directions, that is, within the plane of the sacrificial glazing panels 22A, 22B.

Figure 9:
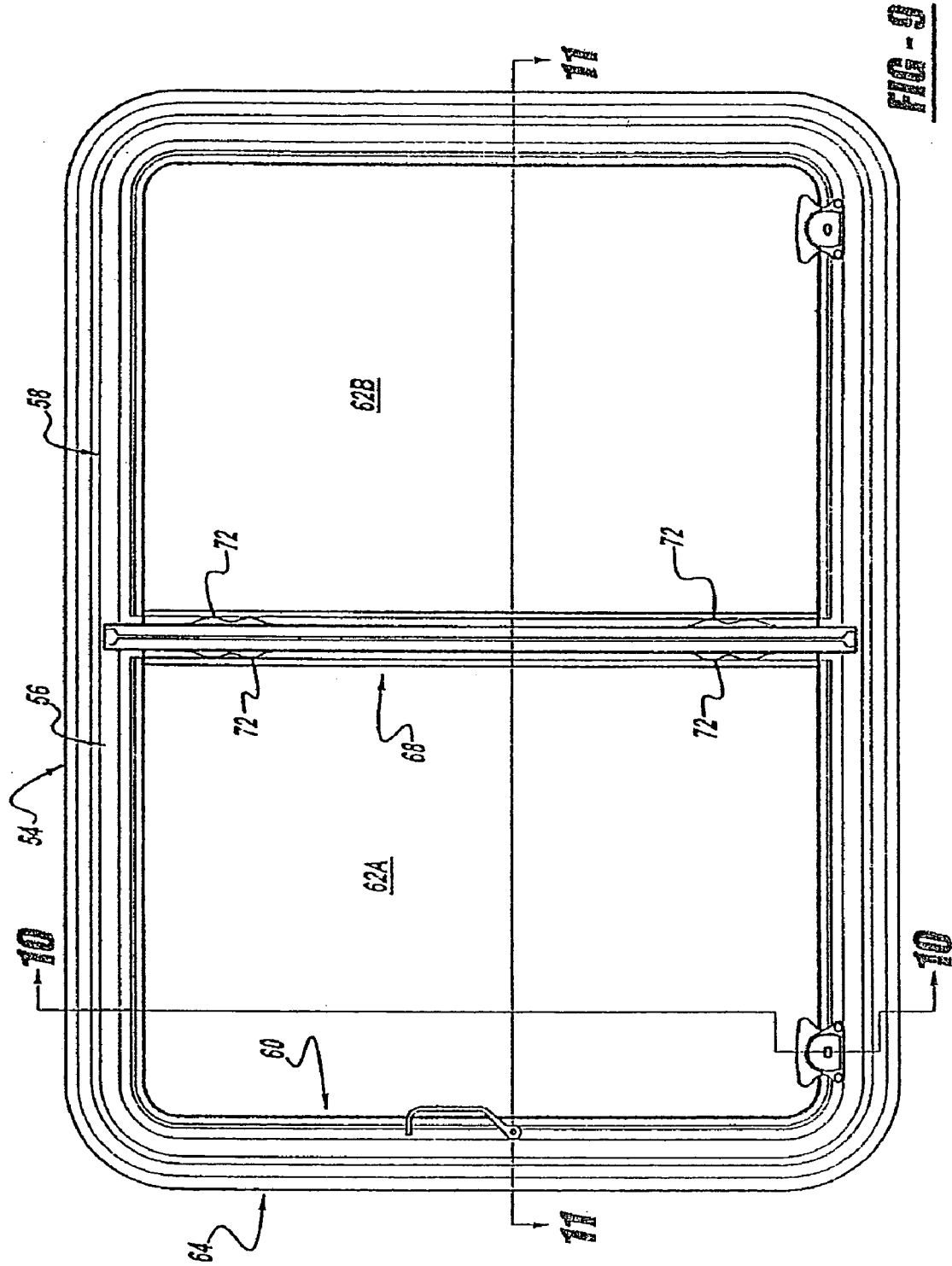
FIG. 9 is a front view of a window having sideways movable glazing panels incorporating a sacrificial glazing panel installation.
Figure 10:
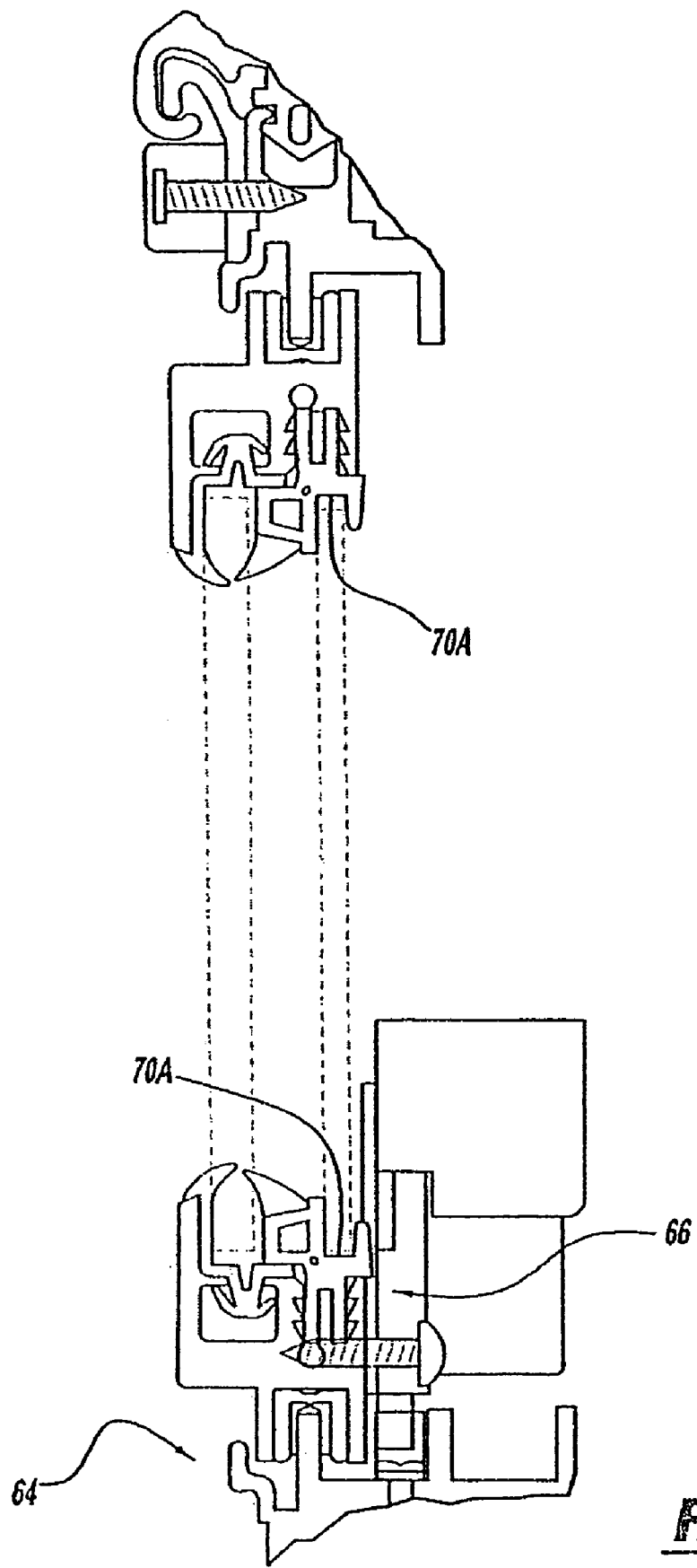
FIG. 10 is a view of the section 10-10 taken in FIG. 9.
Figure 11:
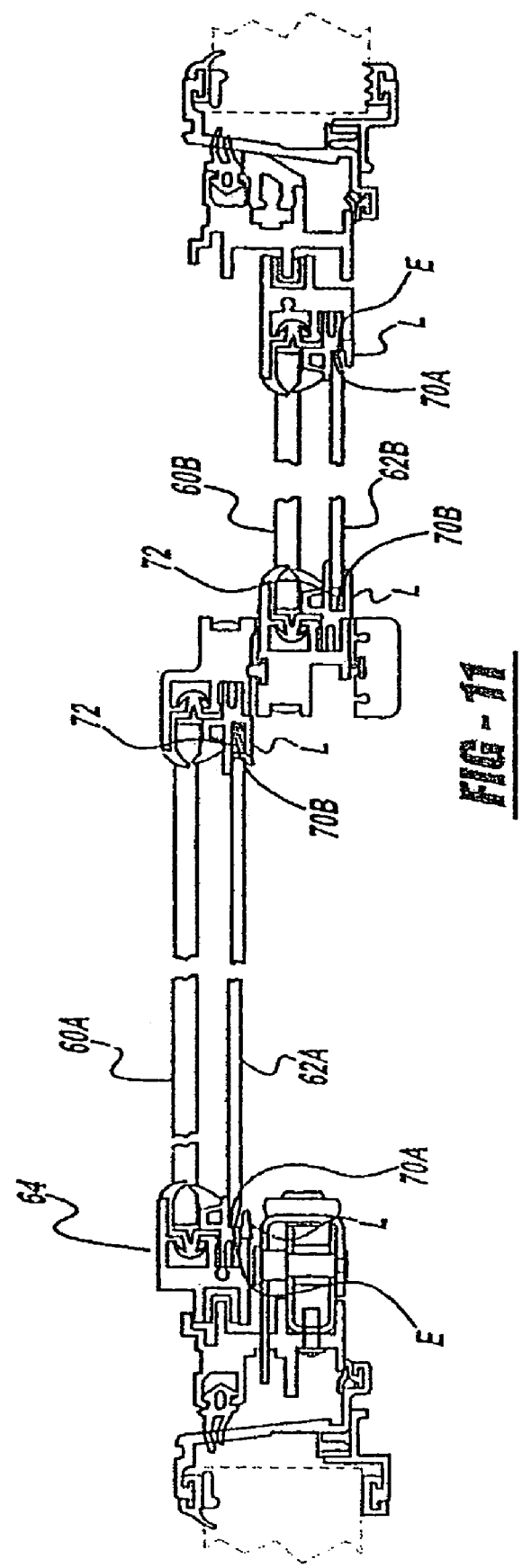
FIG. 11 is a view of the section 11-11 taken in FIG. 9.

The glazing panels may alternatively be shifted sideways in the frame sections for removal. FIG. 9-11 show a window assembly 54 comprised of a pair of side glazing assemblies 56 and 58, each mounted in a frame and seal assembly 64. Each glazing assembly 56, 58 includes a primary glazing panel 60A, 60B and sacrificial glazing panel 62A, 62B mounted in a retainer frame as in the above described embodiments.

A curved corner generally rectangular perimeter frame section 66 and a straight divider frame section 68 respectively define sacrificial glazing panel receiving channel sections 70A, 70B. The vertical divider channel section 70B is deeper than the opposing perimeter channel sections 70A to allow horizontal shifting movement of the sacrificial glazing panel 62A, 62B during installation and removal as described above, instead of the vertical movement described above.

The divider channel section 70B, which is deeper, receives resilient compressible positioner element. The illustrated positioner element is in the form of at least one double bowed leaf spring 72, which may be disposed against the bottom thereof. There may be a pair of springs 72 normally position to bias one side edge of the sacrificial glazing panels 62A, 62B so as to be retained by the lip L of the opposite section of the perimeter channel sections 70A in a similar fashion to the above described embodiment. It is noted that the positioner element can alternatively have other suitable forms as described above.

Thus, in practice, sacrificial glazing panels 62A, 62B can be shifted sideways by compressing the double bowed leaf springs 72 to allow the side edge E to clear the lip L. Upon bowing the sacrificial glazing panels 62A, 62B the top and bottom edges are drawn together to clear the lip L of the top and bottom perimeter channel sections 70A to enable tilting out and removal of the sacrificial glazing panels 62A or 62B. Installation maybe carried out in a complementary fashion.

Figure 12A:
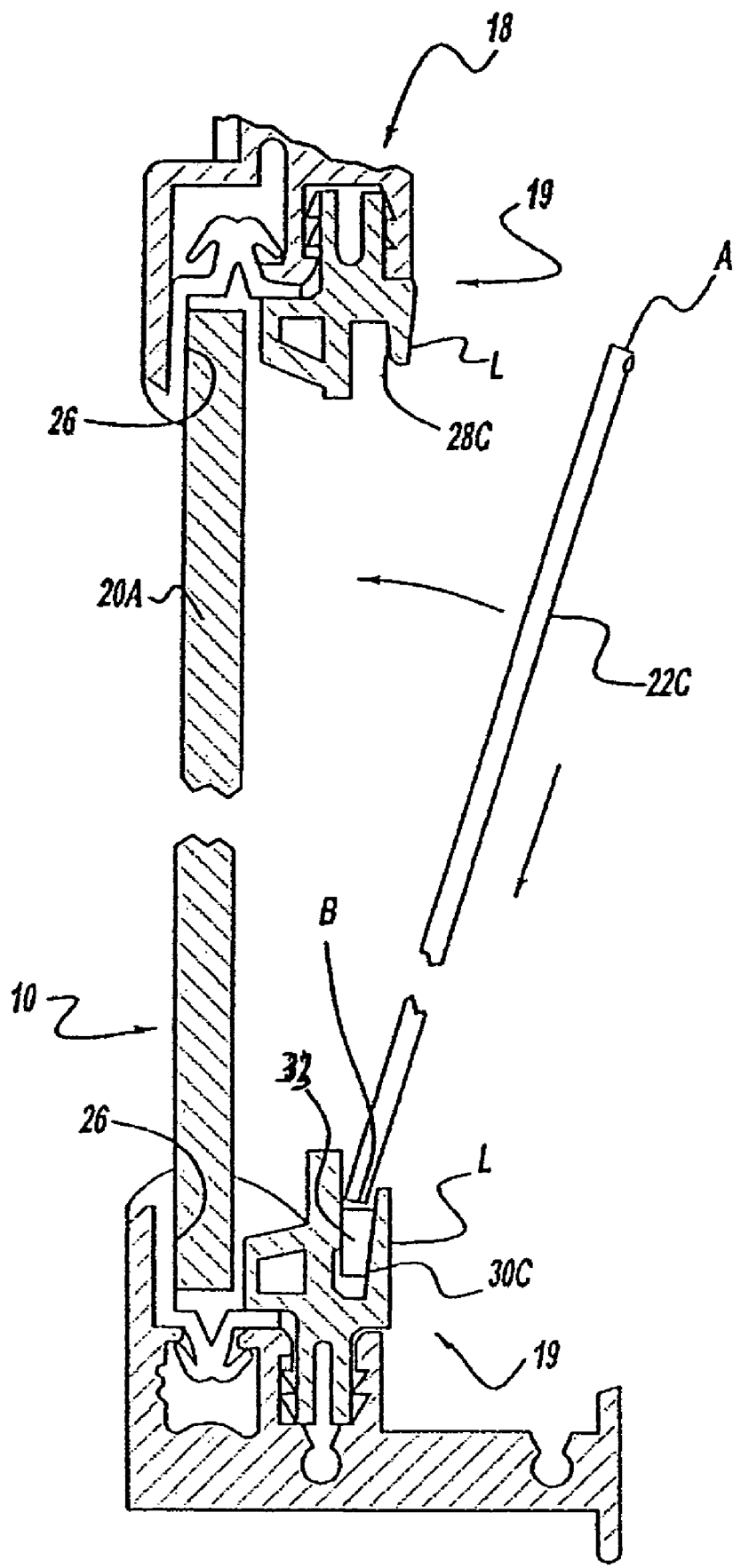
FIG. 12A is a fragmentary section view of a fifth alternate embodiment of a sacrificial glazing panel during installation in a receiving channel section.

FIGS. 12A-12B show an arrangement of a window assembly 10 having a primary glazing 22A supported in a frame 18 against seals 26. The window assembly 10 has a sacrificial glazing assembly disposed adjacent to the primary glazing assembly, which as shown is connected to the frame of the primary glazing assembly. The sacrificial glazing assembly has a sacrificial glazing panel support 19. The sacrificial glazing panel support 19 has a first channel 28C and an opposing second channel 30C which allows the bottom edge B of the sacrificial glazing panel 22C to first be inserted into the second channel 30C and then moved sufficiently in the second channel 30C to allow the second edge A of panel 22C to clear the lip L of the channel section 28C and allow the sacrificial glazing panel 22C to be completely moved into and retained between the first and second channels 28C and 30C as shown in FIG. 12B. Once the bottom edge B of panel 22C clears the lip L, and the top edge A of panel 22C clears the lip L, the bottom edge B rests on elastomeric element 33 in the bottom of the second channel 30C but does not rest on the actual bottom surface of the second channel 30C.

The insertion of the sacrificial glazing panel 22C may be aided by having a flexible panel for bowing of this panel. Upon release of the bowing of the glazing panel 22C, the side edges C, D of the sacrificial glazing panel 22C move apart to be received and retained in the associated side channels of the perimeter frame sections 24C. In this position, the panel 22C is supported by the elastomeric element 33 in the bottom channel 30C, which may move up and down in response to inertia, gravitational forces and other forces experienced by the mass transit vehicle during its normal operation, but edges of panel 22C do not touch the bottom or top surface of the channels 28C, 30C.

FIG. 13 shows an embodiment of a window assembly 10 with a primary glazing 20A and a sacrificial glazing assembly disposed adjacent to the primary glazing. In this case the resiliently compressible positioner element includes a compressible foam elastomeric element 38A. The compressible foam elastomeric element 38A may be inserted into a top channel, side channel, bottom channel or any combination of the above. As shown, a compressible foam elastomeric element 38B is inserted in a top channel 28D and an opposing bottom channel 30D. The foam elements 38A and 38B are highly compliant but resilient, and preferably fill their respective channels 28D, 30D.

The foamed elastomeric elements 38A, 38B are preferably made of highly compliant material, such as micro cellular polyurethane (MCU), etc. A highly compliant material is desired since the sacrificial glazing 22D must be easily installed, yet held in place in the top channel 28C and bottom channel 30C. A highly compliant material is also desired since it can dampen vibrations transmitted to the glazing panel by operation of the vehicle. Alternatively, the foamed elastomeric material may be selected from fluorocarbon, highly saturated nitrile (HBNR), methyl acrylate acid polymer, silicone, EPDM, Neoprene.RTM, natural rubber, plyisoprene or any suitable thermoset elastomer or thermoplastic or optionally any other elastomeric foamed material suitable for the application, including plastomers and thermoplastics.

Foamed micro cellular polyurethane is a polymer product obtained from the interaction of the die-isocyanate glycol and a blowing agent. The glycol may be a polyol that can be either the polyester or polyether type. Both types generally have hydroxyl groups that are free to react with the di-isocyanate. The isocyanate reacts with water to produce carbon dioxide gas for foaming. Foam density may be determined by the quantity of water present in the formulation and may be characterized by the weight of the polyurethane material divided by the overall volume of the part. Once intimately mixed, the ingredients are discharged from a mixer and deposited into a mold or an extruder where the complex chemical reactions take place to form the micro cellular polyurethane.

The chemical reactions are primarily exo-thermic which convert the liquid into a foam. This technology is generally known in the prior art. See Rubber Technology, Third Edition, edit by the Maurice Morton-Van Norstand Reinhold, ISBN 0-422-2642204, pages 555-560, which is incorporated by reference herein. The damping characteristics of a micro cellular polyurethane foam are adjusted by the amount of gases trapped in the body of the polyurethane. Thus, the stiffness, and the vibration characteristics of the micro cellular polyurethane can be adjusted by varying MCU density to meet specific application requirements. Micro cellular polyurethane foam density varies from 0.3 to 0.8 grams per cubic centimeter. The characteristics of MCU or foamed elastomers, as compared to solid rubber, are primarily influenced by the micro cellular structure of the material and not by the chemical backbone or primary polymeric material. Due to the micro cellular nature of the MCU material, polyurethane cells will collapse on to each other under a compressing load.

As stated previously, the micro cellular polyurethane has a cell like structure that includes cell unites filled with gases such as air. When the micro cellular polyurethane is compressed, the cell structures tend to collapse and push the air out of the cells. This material behavior results in a more gradual absorption of sudden load changes, hence a more gradual load absorption, as shown in FIG. 14.

Figure 14:
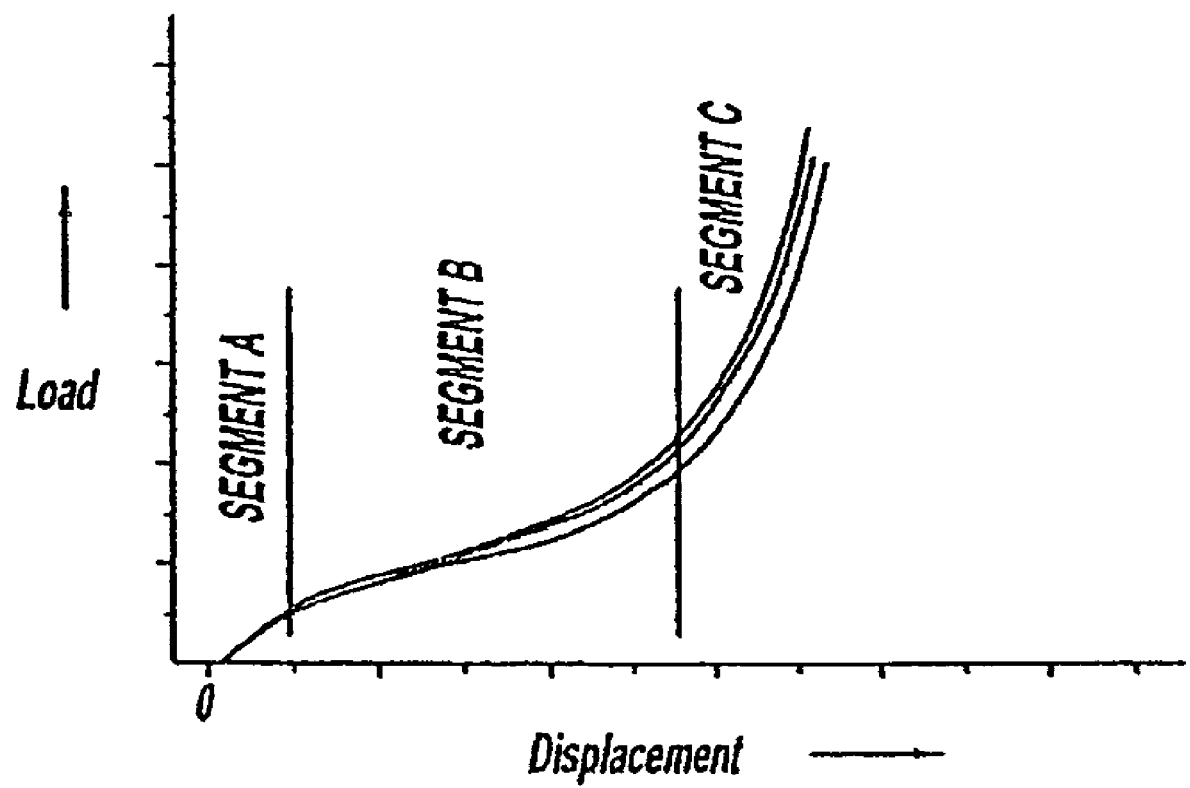
FIG. 14 is a load-displacement relationship for a foamed elastomer.

As a load on the elastomeric member increases from a no-load condition, the stiffness as shown in Segment A in FIG. 14. increases. With further increases in load, the stiffness flattens somewhat as shown in Segment B. This is the "soft" segment where the micro cellular cells of the MCU begin to collapse upon themselves. As the load increases even further and the cells are substantially collapsed upon themselves, the stiffness increases as shown in Segment C in FIG. 14. Those skilled in the art will recognize that the curve shown in FIG. 14 is representative of the general stiffness response to load and displacement for MCU material with an MCU density of 0.3 to 0.8 per cubic centimeter.

In practice, the glazing panel 22D is inserted into the bottom channel 30D and moved into contact with the foamed elastomeric element 38A. The element 38A is designed so that when the glazing panel is pressed into the foamed element 38A, the force and weight of the panel causes the cells to collapse so as to operate in Segment C of FIG. 14. Panel 22D is then moved adjacent to the lip L of the top channel 28D. Next panel 22D is moved into the top channel 28C, then moved into contact with the foamed elastomeric element 38B. After panel 22D is pressed into the foamed element 38A and panel 22D is released, a biasing force from the foamed elastomeric element 38A presses the opposite edge of panel 22D into the foamed element 38B so that the panel compresses the cells in the element 38B and the foamed element 38B operates in Segment C in FIG. 14. The elastomeric elements 38A, 38B may have different elastomeric properties, such as stiffness or resiliency. For example, the bottom elastomeric element 38A may have a greater rebound force than the upper elastomeric element 38B. Those skilled in the art recognize that foamed elastomeric element 38A can also be made to operate in Segment B in FIG. 14 depending on the depth of the channel 30D and the weight of the panel 22 so long as the foamed elastomeric element 38B operates in Segment C in FIG. 14. Thus, a simple and quick installation or removal of sacrificial glazing panels can be performed with a minimum use of tools.

Claim terms should be interpreted as generally understood by one skilled in the art at the time of filing unless expressly defined otherwise. Order of steps in method claims can be done in any reasonable order and therefore should not be given significance unless specifically stated.

From the foregoing disclosure and detailed description of certain preferred embodiments, it is apparent that each of the various features of the various embodiments can be used with each of the other embodiments.

From the foregoing disclosure and detailed description of certain preferred embodiments, it is also apparent that various modifications, additions and other alternative embodiments are possible without departing from the true scope and spirit of the present invention. The embodiments discussed were chosen and described to provide the best illustration of the principles of the present invention and its practical application to thereby enable one of ordinary skill in the art to utilize the invention in various embodiments and with various modifications as are suited to the particular use contemplated. All such modifications and variations are within the scope of the present invention as determined by the appended claims when interpreted in accordance with the benefit to which they are fairly, legally, and equitably entitled.

What is claimed is:

1. A window assembly for a vehicle comprising:
a frame for mounting to a vehicle;
a primary glazing panel held within a first perimeter channel formed by the frame;
wherein an interference fit is formed between the first channel and the primary glazing panel in a lateral direction normal to the primary glazing panel to prevent movement of the primary glazing panel within the channel in the lateral direction normal to the primary glazing panel;
a sacrificial glazing panel disposed inward of the primary glazing panel and held within a second perimeter channel formed by the frame;
wherein the sacrificial glazing panel is a flexible panel formed of a material having a thickness to permit flexing of the sacrificial glazing panel to removably seat the sacrificial glazing panel within the second channel;
wherein the sacrificial glazing is free of an interference fit within the second channel in the lateral direction normal to the sacrificial glazing panel so that the sacrificial glazing panel can move within the second channel in the lateral direction normal to the sacrificial glazing panel;
wherein the frame includes a seal member forming the first channel and a retaining member forming the second channel;
wherein the retaining member includes a seal-engaging portion engaging the seal member to form the interference fit in the lateral direction; and
wherein the retaining member is a unitary one-piece, dual durometer component having a first polymeric material forming the second channel and a second polymeric material forming the seal engaging portion, and the first polymeric material has a higher durometer than the second polymeric material.

2. The window assembly of claim 1, further comprising at least one resiliently compressible positional element located adjacent one edge of the sacrificial glazing panel within the second channel to bias the sacrificial glazing panel toward a portion of the second channel holding an opposite edge of the sacrificial glazing panel.

3. The window assembly of claim 2, wherein the positional element biases the sacrificial glazing panel to prevent a gap at the opposite edge of the sacrificial glazing panel.

4. The window assembly of claim 2, wherein a length of the sacrificial glazing panel is less than a distance between portions of the second channel holding the length of the sacrificial glazing panel to form a gap between the sacrificial glazing panel and the second channel for insertion and removal of the sacrificial glazing panel and wherein the positional element biases the sacrificial glazing panel to resiliently eliminate the gap when the sacrificial glazing panel is located within the second channel.

5. The window assembly of claim 1, wherein the seal engaging portion is cantilevered and arcuate in cross-section.

6. The window assembly of claim 1, wherein flocking material is provided within the second channel so that the sacrificial glazing panel engages the flocking material within the second channel to reduce rattling noise due to movement of the sacrificial glazing panel against the channel.

* * * * *